(No Model.)
C. G. TURNER.
DEVICE FOR SECURING PISTON RODS TO CROSS HEADS.
No. 524,033.          Patented Aug. 7, 1894.
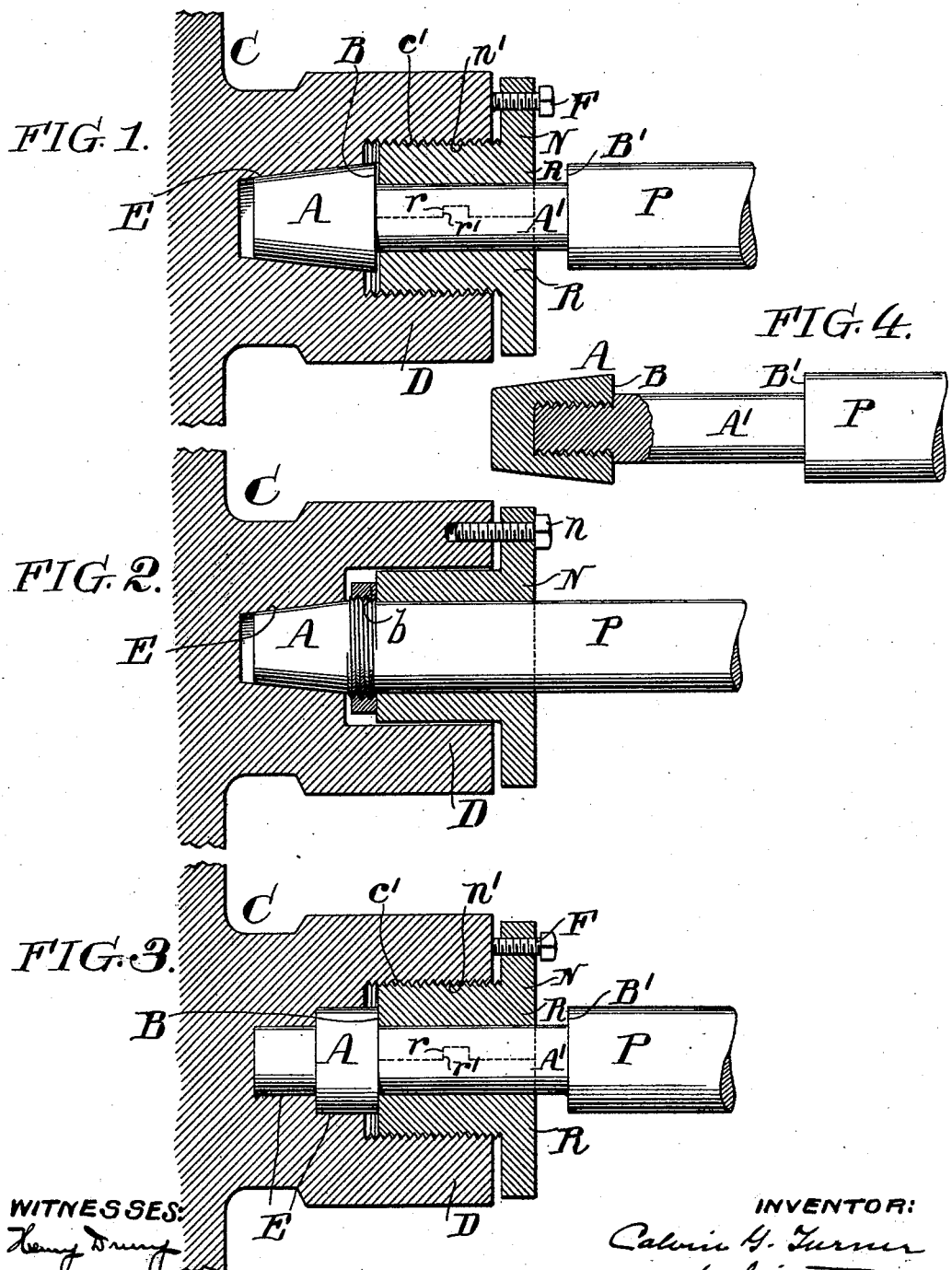

UNITED STATES PATENT OFFICE.

CALVIN G. TURNER, OF WILMINGTON, DELAWARE.

DEVICE FOR SECURING PISTON-RODS TO CROSS-HEADS.

SPECIFICATION forming part of Letters Patent No. 524,033, dated August 7, 1894.

Application filed May 3, 1894. Serial No. 509,865. (No model.)

*To all whom it may concern:*

Be it known that I, CALVIN G. TURNER, a citizen of the United States, residing at Wilmington, in the county of New Castle, in the State of Delaware, have invented a new and useful Improvement in Devices for Securing Piston-Rods to Cross-Heads, of which the following is a true and exact description, reference being had to the accompanying drawings, which form a part thereof.

My invention relates to means for securing piston plungers or other similar rods to cross-heads. Heretofore the most usual mode of securing these parts has been by means of a key or pin which was driven through registering holes or slots in the cross head and piston rod. In many cases, especially when considerable strains came on this connection the pin or key would be bent, and very often the cross head or rod broken. To overcome the evils incident to this mode of securing a piston rod to a cross head, I provide a socket in the cross head and secure or form a head on the rod which is adapted to fit into the socket, and provide a block which, when properly adjusted will bear against an abutment on the rod, and force the head thereon firmly into the socket in the cross head.

My invention can best be described in connection with the accompanying drawings, in which—

Figure 1 is a side view, partly in section, of a cross head and piston rod secured together according to my invention. Fig. 2 is a view similar to that shown in Fig. 1 illustrating a modification. Fig. 3 is a detail view showing another mode of securing the head to the end of the rod, and Fig. 4, a view similar to Fig. 1, illustrating a further modification.

C is a cross head having formed therein a suitable socket E of any desired form; that shown in Fig. 1 being conical, the preferred form, and that shown in Fig. 3, cylindrical.

P is a piston or plunger rod having a head A adapted to fit the socket E in the cross head, this head may be forged or otherwise formed integral with the rod, as indicated in Figs. 1 and 2, or it may consist of a separate piece screwed or otherwise secured thereto as shown in Fig. 4. I preferably form this head somewhat larger in cross section than the piston rod just behind it so that the shoulder B thus formed will serve as an abutment, this however, is not necessary as an independent abutment, as the ring *b*, Fig. 2, may be provided if desired.

N is a block adapted to engage with the abutment on the rod so as to force and hold the head A in the socket of the cross head, suitable means being provided for adjusting the position of the block relatively to the cross head. In Fig. 2 the block is shown as a plain collar and bolts *n* are provided for drawing the collar up so as to hold the piston rod in position; I prefer however, to form the block as a nut having screw threads as *n'* adapted to engage with corresponding threads *c'* on the cross head, preferably in a tapped out portion D thereof of greater cross section than the socket E.

It will, of course, be noted, that when an independent head piece is provided, as shown in Fig. 4, the nut collar or block N can be made in one piece and slipped on the rod when said head is removed, also, if there is no reduced portion as A' formed in the rod the nut or block N could be put on the rod from the piston end by removing the piston. I prefer however, to form a reduced portion A' in the rod so that shoulders B B' will be formed, as shown in Fig. 1, and in this case I form the nut in two or more segmental parts R, R as indicated in Figs. 1 and 3, *r r'* being a tongue groove on the two parts whereby they are fitted together and screwed into the tapped out hole in section D as an uncut nut.

F is a set screw to hold the nut in position after it is properly screwed up.

It will be observed that in this construction if the head A should stick in the socket E that the nut or block N when it is unscrewed will abut against the shoulder B' and draw out the head from the socket. As has been said, the socket E is preferably tapered, as shown, in which case the head A would be conical so that when it is forced into the socket by the nut or block the fit will be very tight and the strains distributed over all the cross head.

Having now described my invention, what I claim as new, and desire to secure by Letters Patent, is—

1. The combination with a cross head having a socket therein, of a piston or other rod having a head adapted to seat in said socket, an abutment on the rod, a block adapted to engage with the abutment and means for adjusting the block relatively to the cross head whereby by altering the position of the block relatively to the cross head the piston rod head will be forced into the socket in the cross head by the motion of the block.

2. The combination with a cross head having a socket therein, of a piston or other similar rod having a head of larger size than the size of the rod behind it whereby it forms an abutment, a block adapted to abut against the head on the rod and means for adjusting the position of the block relative to the cross head whereby the head will be forced into the socket therein by the motion of the block.

3. The combination with a cross head having a socket therein of a piston or other similar rod having a head of larger size than the size of the rod behind it whereby it forms an abutment, a nut having screw threads adapted to engage with corresponding threads on the cross head and adapted to engage with the head on the rod whereby said head will be forced into the socket in the cross head as the nut is properly turned.

4. The combination with a cross head having a socket therein and a tapped portion D, of a piston or other rod having a head secured to or formed integral therewith and a nut formed in two or more segmental parts adapted to embrace the rod and abut against the head on the rod and arranged to engage with the threads of the tapped portion of the cross head whereby the head of the rod will be forced into the socket in the cross head.

5. The combination with a cross head having a tapped portion and also having a conical socket E, of a piston rod having a conical head adapted to seat in said socket, said head being of sufficient size to form an abutment and a nut formed in two or more segmental parts adapted to fit in the tapped portion of the cross head and abut against the head.

6. The combination with a cross head having a socket therein, of a piston rod having a head A and a reduced portion A′ behind the head whereby shoulders B and B′ are formed, a nut N divided into two or more segmental parts adapted to embrace the reduced portion of the rod and engage with threads on the cross head so that by screwing or unscrewing the nut the head on the rod can be forced in or out of the socket in the cross head.

CALVIN G. TURNER.

Witnesses:
ALF. H. FABER,
D. STEWART.